(12) United States Patent
Koch et al.

(10) Patent No.: US 7,477,907 B2
(45) Date of Patent: Jan. 13, 2009

(54) UNIVERSAL CALL CONTROL SYSTEMS AND METHODS

(75) Inventors: Robert A. Koch, Norcross, GA (US); Robert G. Hensey, Jr., Norcross, GA (US); Shiejye Geoffrey Lin, Duluth, GA (US); David Archie Scott, Norcross, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 0 days.

(21) Appl. No.: 11/072,717

(22) Filed: Mar. 4, 2005

(65) Prior Publication Data

US 2005/0204030 A1 Sep. 15, 2005

Related U.S. Application Data

(62) Division of application No. 10/012,746, filed on Dec. 7, 2001.

(60) Provisional application No. 60/277,517, filed on Mar. 19, 2001.

(51) Int. Cl.
*H04Q 7/20* (2006.01)

(52) U.S. Cl. .................. 455/456.2; 455/414.1; 455/415; 455/456.3; 455/457; 379/207.15; 379/218.01

(58) Field of Classification Search .................. 455/414, 455/404.2, 414.1, 456.2, 456.3, 457
See application file for complete search history.

(56) References Cited

U.S. PATENT DOCUMENTS

| 5,023,868 | A | 6/1991 | Davidson |
|---|---|---|---|
| 5,127,003 | A | 6/1992 | Doll, Jr. |
| 5,315,636 | A | 5/1994 | Patel |
| 5,517,406 | A | 5/1996 | Harris |
| 5,572,528 | A | 11/1996 | Shuen |
| 5,711,006 | A * | 1/1998 | Brochu et al. ............... 455/445 |
| 5,737,395 | A | 4/1998 | Irribarren |
| 5,818,919 | A | 10/1998 | Berberich, Jr. |
| 5,903,845 | A | 5/1999 | Buhrmann et al. |
| 5,915,008 | A | 6/1999 | Dulman |
| 5,917,817 | A | 6/1999 | Dunn |
| 5,930,700 | A | 7/1999 | Pepper et al. |

(Continued)

OTHER PUBLICATIONS

My Optimum Voice, Oct. 18, 2005, http://www.optimumvoice.com, Optimum Voice.

*Primary Examiner*—Fan Tsang
*Assistant Examiner*—Simon Sing
(74) *Attorney, Agent, or Firm*—Scott P. Zimmerman, PLLC

(57) ABSTRACT

Methods and systems for providing a user with control over telecommunications services provided by a service provider. Using almost any type of communications device, a user may gain access to, view, and make changes or modifications to profile information related to the services. The changes may be made quickly and efficiently, but accuracy and thoroughness in the implementation of the changes are not sacrificed. Further, the changes to the communications services are implemented almost immediately and without involvement by the service provider. Particularly, profile information about the telecommunications service is stored on a server in a data network. A change action relating to the profile information may be received at the server from a data device (such as a wireless unit) operating on the network. The change action is implemented on the profile information to result in changed profile information, which may be provided from the server via the data network to the telecommunications system.

12 Claims, 7 Drawing Sheets

U.S. PATENT DOCUMENTS

| | | |
|---|---|---|
| 5,950,126 A | 9/1999 | Palviainen et al. |
| 6,005,870 A | 12/1999 | Leung et al. |
| 6,014,437 A | 1/2000 | Acker |
| 6,028,917 A | 2/2000 | Creamer |
| 6,058,415 A * | 5/2000 | Polcyn ................... 709/200 |
| 6,154,644 A * | 11/2000 | Murray ................. 455/414.1 |
| 6,185,285 B1 | 2/2001 | Relyea et al. |
| 6,292,671 B1 * | 9/2001 | Mansour ................. 455/518 |
| 6,295,291 B1 * | 9/2001 | Larkins ................... 370/352 |
| 6,404,860 B1 | 6/2002 | Casellini |
| 6,697,461 B1 | 2/2004 | Middleswarth et al. |
| 6,708,033 B1 * | 3/2004 | Linkola et al. ............. 455/440 |
| 6,816,719 B1 * | 11/2004 | Heinonen et al. .......... 455/403 |
| 6,819,919 B1 * | 11/2004 | Tanaka ................. 455/414.1 |
| 7,130,630 B1 * | 10/2006 | Enzmann et al. ......... 455/435.1 |
| 7,272,662 B2 | 9/2007 | Chesnais et al. |

* cited by examiner

- Customer Profile resides on web server
- Customer Profile is accessed via web (PC), phone (VXML), or PDA to view or modify profile data
- All types of access require password authentication
- Customer Profile is retrieved for use in incoming call processing via an SCP-to-web server query
- Customer Profile Data:
  - My Telephone Number (Subscriber's DN)
  - Call Forwarding Data:
    - Forwarding status (on/off)
    - Active Reach Number (Home, Mobile, or Unified Mailbox)
    - Reach Numbers:
      - Home
      - Mobile
      - Unified Mailbox (e.g., hello-direct or ureach)
  - Do Not Disturb Data:
    - DND Status (on/off)
    - Priority caller phone number
  - Customized Message Data:
    - CM Status (on/off)
    - CM Caller's phone number
    - CM Text (up to 100 characters)

FIG. 6

FIG. 7
SCP-to-Web Server TCP/IP Message Set

TCP/IP Query:
- Character 0: Start Delimiter
  - 1 octet
  - ASCII left brackets character "["
- Character 1: Type
  - 1 octet
  - ASCII "q" character (for query)
- Characters 2-11 Subscriber DN
  - 10 octets
  - Subscriber's 10-digit DN
    (key into profile DB on web server)
- Character 0: End Delimiter
  - 1 octet
  - ASCII right brackets character "]"

TCP/IP Response:
- Character 0: Start Delimiter
  - 1 octet
  - ASCII left brackets character "["
- Character 1: Type
  - octet
  - ASCII "r" character (for query)
- Characters 2-11
  - 10 octets
  - Subscriber's 10-digit DN
- Character 12 Call Forwarding Status
  - 1 octet
  - equals 0 if forwarding off
  - equals 1 if forwarding on
- Character 13 Active Reach Number
  - equals ASCII "h" if Home
  - equals ASCII "m" if Mobile
  - equals ASCII "u" if Unified Mailbox

TCP/IP Response (cont.):
- Characters 14-23 Reach Number: Home
  - 10 octets
  - 10-digit home DN
- Characters 24-33 Reach Number: Mobile
  - 10 octets
  - 10-digit mobile DN
- Characters 34-43 Reach Number: Unified Mailbox
  - 10 octets
  - 10-digit Unified Mailbox DN
- Characters 44 Do Not Disturb Status
  - 1 octet
  - equals 0 if DND off
  - equals 1 if DND on
- Character 45-54 Priority Caller DN
  - 10 octets
  - 10-digit Priority Caller DN
- Character 55 Customized Message Status
  - 1 octet
  - equals 0 if CM off
  - equals 1 if CM on
- Characters 56-65 CM Caller's phone number
  - 10 octets
  - 10-digit CM Caller's DN
- Characters 66-165 CM Text (up to 100 characters)
- Character 166: End Delimiter
  - 1 octet
  - ASCII right brackets character "]"

UNIVERSAL CALL CONTROL SYSTEMS AND METHODS

CROSS-REFERENCE TO RELATED APPLICATIONS

This divisional application claims priority to and the benefit of the prior filed and commonly owned provisional application entitled "Universal Call Control" filed in the United States Patent and Trademark Office on Mar. 19, 2001, assigned Ser. No. 60/277,517, and incorporated herein by reference.

This divisional application claims priority to and the benefit of the prior filed co-pending and commonly owned U.S. patent application entitled "Universal Call Control" filed in the United States Patent and Trademark Office on Dec. 7, 2001, assigned Ser. No. 10/012,746, and incorporated herein by reference.

TECHNICAL FIELD

The inventions generally relate to a user's control over telecommunications services provided by a service provider. More specifically, the inventions relate to systems and methods that allow a user to gain access to, view, and make changes or modifications to profile information related to the telecommunications services.

BACKGROUND

A wide variety of communications services are available including, for example, call waiting, call forwarding, call blocking, do not disturb services, customized messaging services, communications circles, etc. Generally, the services are implemented for a particular customer based on profile information relating to the customer's preferences. For example, a customer may have call forwarding service implemented so all calls to his or her home telephone number during business hours are forwarded to a network voice mail service. As another example, a customer may have call blocking service implemented so calls received from a specific number during evening hours are blocked.

A customer's preferences with respect to communications service may change from time to time. Referring to the examples above, the customer may decide to have calls that were previously forwarded to the network voice mail service forwarded instead to an office telephone. With respect to the call blocking service, the customer may decide to extend the call blocking service to block calls from another specific number. To accommodate the change in preferences, the customer's profile information relating to the communications service may need to be changed.

Generally, the service provider providing the service makes the change in the customer's profile information relating to the service. The service provider typically makes the change because the service provider delivers the service, and thus, controls the delivery of the service.

To make a change in a communications service, a customer notifies the service provider. The customer may notify the service provider in a number of different ways, which include calling a customer service number, or using the Internet to reach the service provider's web site and communicating the desired changes. Some service providers allow a customer to call a feature access code (FAC) and provide change instructions.

The necessity of having the customer contact the service provider and provide the change instructions significantly slows the desired change in the communications services. The additional necessity of having the service provider implement the change instructions further slows the desired change. Some customers may plan ahead or be patient so a delay of a desired change to communications services may not be important. Most customers, however, desire their changes to communications services to take effect as close to immediately as possible.

Therefore, there is a need for faster ways of implementing a customer's desired changes to his or her communications services. There is also a need for more convenient ways of implementing a customer's desired changes. In addition, there is a need for faster and more convenient ways of implementing a customer's desired changes to his or her communications services without sacrificing qualities such as accuracy and thoroughness in the implementation of the changes.

SUMMARY

The inventions generally relate to a user's control over telecommunications services provided to the user by a service provider. By these inventions, a user is allowed to gain access to, view, and make changes or modifications to profile information related to the telecommunications services provided to the user. Advantageously, the inventions allow a user to use almost any type of communications device to make changes in communications services provided to him or her. The changes may be made by the user quickly and efficiently, but qualities such as accuracy and thoroughness in the implementation of the changes are not sacrificed. Further, the changes to the communications services are implemented without involvement by the service provider in the change process.

More particularly, the inventions allow a user to access profile information related to communications services, view the profile information, and make changes or modifications to the profile information so as to add, delete, turn-on, turn-off, or otherwise modify the communications services. Any changes or modifications made by the user are effective almost immediately, and without involvement of the service provider in the change process.

The inventions include an exemplary method for direct access to change a telecommunications service in a telecommunications system. Per this method, profile information about the telecommunications service is stored on a server in a data network. A change action relating to the profile information may be received at the server. The change action may be received from a data device (such as a wireless unit) operating on the data network. The change action is implemented on the profile information to result in changed profile information being stored on the server. The changed profile information is provided from the server via the data network to the telecommunications system for use in providing the telecommunications service. In an embodiment, the changed profile information is provided to the telecommunications service in response to a request from the telecommunications system received at the server.

The inventions also include an exemplary system for directly changing the implementation of a telecommunications service without intervention by the service provider. The telecommunications service may be provided to a customer, and the customer may make changes directly by using a wireless unit. For example, the customer may use a personal digital assistant (PDA), an interactive pager (i-pager or IP), an interactive television (TV), or a wireless application protocol (WAP) phone. The wireless unit may be used to send an instruction relating to a change in the implementation of the telecommunications service to a service platform in a data network.

The service platform in the data network communicates with the telecommunications system. The service platform stores profile information relating to the implementation of the telecommunications service provided by the service provider. In an embodiment, the service platform stores the profile information as-a-whole. An embodiment also provides for the unique storage of the profile information by the service platform. In other words, in this exemplary embodiment, the telecommunications system does not store the profile information, and must request the service platform for the profile information. For example, the request may be made when the telecommunications system is providing a telecommunications service to the customer. As noted, a customer may use a wireless unit to send an instruction to change the profile information relating to the telecommunications services to be provided to the customer. The service platform may receive the instruction from the wireless unit, change the profile information based on the instruction, and send the profile information to the telecommunications system. The profile information is received by the telecommunications system and the profile information is used to change the implementation of the telecommunications service.

In addition, the inventions include a method for use of a customer's telecommunications profile with another service so as to change the telecommunications service to the customer in light of the other service. This method stores the customer's profile relating to telecommunications services, and also stores an entry of information related to the customer with respect to the other service provided to the customer. The entry of information may be reviewed for relevance to the telecommunications services of the customer. Relevance may be established if the entry of information allows for changes in the provision of the telecommunications services to the customer. For example, the information may include a reference to a future activity of the customer. The future activity of the customer may necessitate a change in the telecommunications services provided to the user such as a change in a call forwarding number, etc. If the entry of information is relevant to the telecommunications services of the customer, then the customer's profile relating to the telecommunications services is changed to reflect the entry of information.

Further, the inventions may include a method for updating a customer's profile with respect to a telecommunications service provided to the customer by a telecommunications system. The method may store the customer's profile on a server in a data network. The server also may store an application for providing a service to the customer other than the telecommunications service. Application information may be received at the server in the data network. The application information may be used with the application in providing the service other than the telecommunications service to the customer. The server may determine the application information relates to the customer's profile with respect to the telecommunications service provided to the customer. If that determination is made, then the customer's profile may be updated with the application information. In an embodiment, the customer's profile updated with the application information may be provided from the server via the data network to the telecommunications system for use by the telecommunications system in providing the telecommunications service to the customer.

For example, the application providing the service other than the telecommunications service to the customer may be an itinerary application. The application information may include itinerary information. In this example, the customer's profile may be updated with the itinerary information. The updating of the customer's profile with the itinerary information may result in the telecommunications services being provided pursuant to the customer's profile as updated by the itinerary information.

The inventions, in addition, may include, a method to manage a user's telecommunications services in light of a calendar of the user. The profile information about the user's telecommunications services may be stored on a server in a data network. A calendar including entries of activities of the user also may be stored on the server. An entry in the calendar may be received with the entry indicating a future activity of the user. In response to receipt of the entry in the calendar of the future activity, the profile information about the user's telecommunications services may be changed to reflect or correspond to the future activity.

For example, the future activity may include an activity associated with a telephone number other than the directory number of the user. In this example, the profile information may be changed to include the telephone number associated with the activity so the telecommunications services provided during the activity to the user correspond to the telephone number associated with the activity.

To illustrate, the profile information may be changed to forward communications for the user received during the future activity to a number associated with the future activity. As an example, the profile information may be changed to block communications received during the future activity. The profile information also may be changed to include activation of a do not disturb feature during the future activity with respect to the directory number of the user. Further, the profile information may be changed to include a message to be provided to calls to the directory number of the user if the calls are received during the future activity. In an embodiment, in response to a request from the provider, the profile information (as changed to reflect the future activity) is provided to the provider of the user's telecommunications services.

The inventions also include a method for facilitating the narrowing of the number of possible locations of a person when the person is being sought. The facilitation includes storing profile information about telecommunications services provided to the person. The profile information may be stored on a server in a data network, and the profile information may include data about real-time use of a wireless communications unit by the person.

Access to the profile information may be allowed (or allowed only to an authorized searcher as included in the profile information) to determine whether the data about the real-time use of the wireless communications unit indicates the wireless communications unit is activated. If the data indicates the wireless communications unit is activated, a communication may be held with the wireless communications unit to determine the person's location.

In sum, the inventions described herein store profile information about a customer's communications services in such a manner that the customer may use almost any type of communications device to access the profile information, and to make changes or modifications as desired. Advantageously, the customer may use the most convenient communications device to him or her to effect changes in his or her communications services at almost any time and from almost any place so as to make the communications services best serve the needs of the customer as he or she determines.

Other systems, methods, and/or computer program products according to the exemplary embodiments will be or become apparent to one with skill in the art upon review of the following drawings and detailed description. It is intended that all such additional systems, methods, and/or computer program products be included within and protected by this description and be within the scope of this invention.

BRIEF DESCRIPTION OF THE DRAWINGS

The above and other embodiments, objects, uses, advantages, and novel features are more clearly understood by reference to the following description taken in connection with the accompanying figures, wherein:

FIG. 6 illustrates exemplary data that may be included in a customer profile in exemplary embodiments.

FIG. 7 illustrates an exemplary TCP/IP message set that may be used in exemplary embodiments.

DETAILED DESCRIPTION

Figure 1:
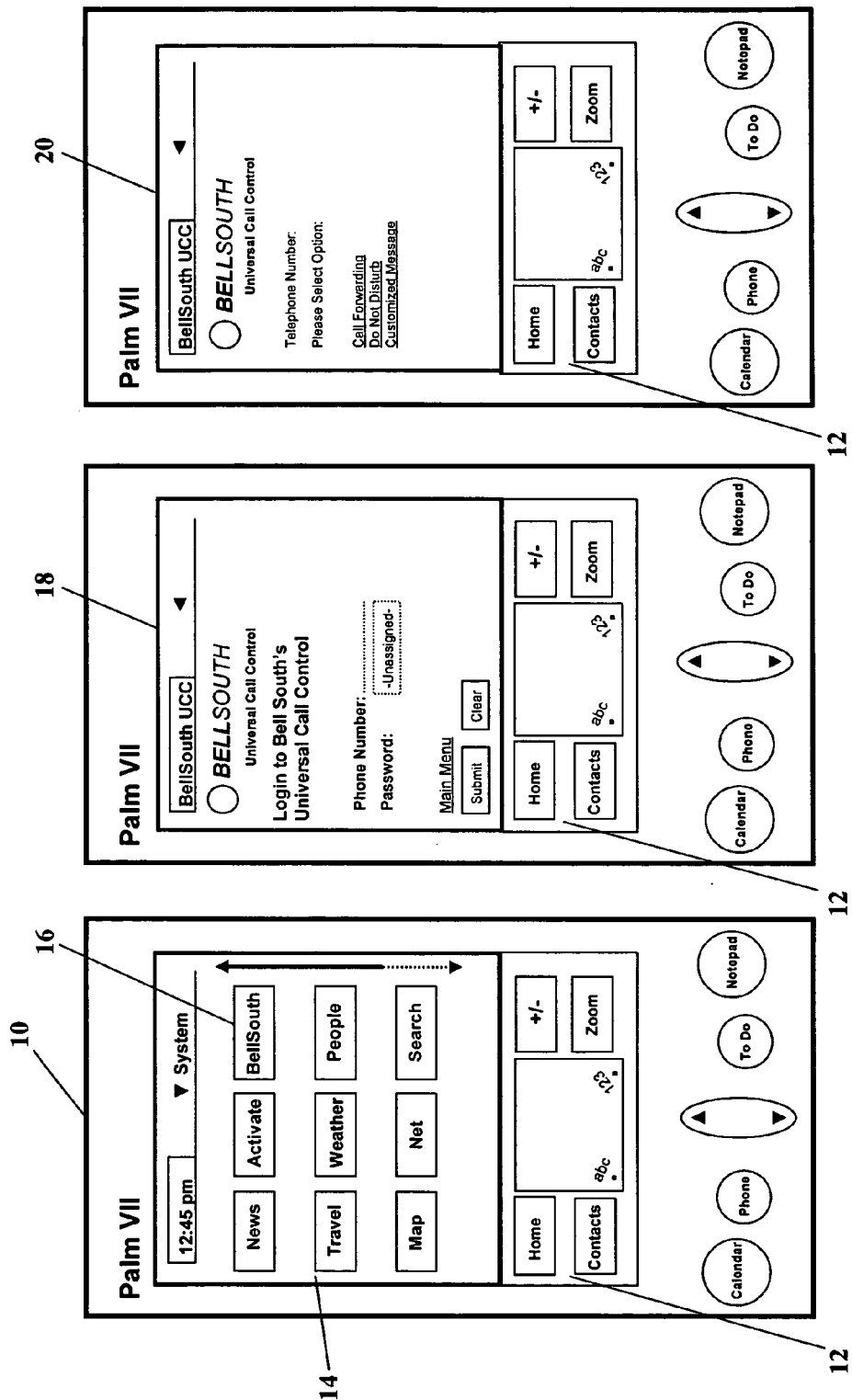
FIG. 1 illustrates an exemplary wireless unit that may be used with the exemplary embodiments of the inventions.

The exemplary embodiments now will be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting exemplary embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, illustrations, graphical user interfaces, and the like represent conceptual views or processes illustrating systems, methods and computer program products embodying this invention. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

According to some of the exemplary embodiments, the inventions described herein allow a customer to use almost any type of communications device to make changes in communications services provided to him or her. Advantageously, the customer may make the changes himself or herself, and the changes to the communications services are implemented without involvement by the service provider in the change process.

More particularly, the inventions allow a customer to access profile information related to communications services, view the profile information, and make changes or modifications to the profile information so as to add, delete, turn-on, turn-off, or otherwise modify the communications services. Any changes or modifications made by the customer are effective almost immediately.

Moreover, the customer may gain access to, view, and make changes or modifications to the profile information using almost any kind of device. Advantageously, a customer may use a wireless device such as a personal digital assistant (PDA), an interactive pager (IP), an interactive television (TV), a wireless telephone, or any other device having data transmission features that allow operation through the use of the wireless application protocol (WAP). A telephone or other device that may operate with the WAP is typically referred to as a WAP phone. The customer also may gain access to and make changes or modifications to profile information using a wireline device such as a telephone, a personal computer (PC), or any other similar device. The term "customer" is used herein to refer to a user (including a person or an entity) who may make use of the inventions.

For example, assume a customer subscribes to a call forwarding service on a business telephone number. Also assume the customer is going home to work and would like calls to the business telephone number to be forwarded to the home telephone number. Using the systems and methods of the inventions, the customer may change the "forwarded-to" number using almost any type of communications device, and the change may take effect almost immediately. Alternatively, the customer may specify the changes take effect at a later time/date.

FIG. 1 provides an example of how a customer may make the above call forwarding change through use of a PDA, such as the illustrated Palm VII Handheld from Palm, Inc., Santa Clara, Calif. Of course, the inventions described herein may be used with other PDAs including, but not limited to: the Cassiopeia EM-500 or E-125 from Casio, Dover, N.J.; the Sony Clie from Sony Corporation, Tokyo, Japan; the DaVinci or the Vista from Royal, Bridgewater, N.J.; the ECHO or the PDA-256 Pen Based Organizer from Oregon Scientific, Tualatin, Oreg.; the Palm m100, m105, VIIx, Vx, IIIc, or IIIxe from Palm, Inc., Santa Clara, Calif.; the iPAQ Pocket PC H3600 series or the H3100 series, or the Aero 1500 from Compaq Computer Corporation, Houston, Tex.; the jornada 720 or 680/690, or the hp 600, 300, or 200 series from Hewlett-Packard Company, Palo Alto, Calif.; the Visor, the Visor Deluxe, Platinum, or Prism from Handspring, Inc., Mountain View, Calif.; the Nino 500 or 200 from Philips CFT North America, Sunnyvale, Calif.; the Revo or Revo Plus from Psion Inc., Concord, Mass., the Mobile Companion MC 218 from Ericsson, Stockholm, Sweden, or any other suitable device.

Referring to FIG. 1, the PDA 10 includes a graphic user interface (GUI) representing an applications manager. On the monitor 12 of the PDA 10, the GUI displays icons 14 of applications, features, and services available for use with the PDA 10. This display of icons 14 also may be referred to herein as the desktop of the PDA 10. Particularly, the desktop of the PDA 10 includes an icon 16 for BellSouth Corporation (BellSouth), Atlanta, Ga. BellSouth is the communications service provider to this exemplary customer, and, in particular, the service provider of the call forwarding service to the customer's business telephone number. When the customer activates the icon 16, the display on the monitor 12 changes to the BellSouth interface, as shown on PDA 18.

The first display on the monitor 12 of the BellSouth interface allows the customer access to the Universal Call Control (UCC) system via a log-in prompt. The UCC system is an exemplary system that may be used to implement the systems and methods of the inventions described herein. The nomenclature of "Universal Call Control" for this exemplary system is particularly apt because the system allows a customer to control the services provided to the customer's telecommunications services, and allows the customer to have such control from almost any type of communications device. Another name for such an exemplary system may be "Multi-Mode Access" system because the customer may use one or more of multiple devices to readily access profile information so the customer's communications services may be changed as desired by the customer.

In logging-in to the UCC system, the customer may be required to provide information such as a password or other identifier for authentication and/or verification as an authorized user of the UCC system. After the customer logs-in and is deemed authorized and/or verified, if necessary, the display on the monitor 12 changes, as illustrated on PDA 20, to show a list of the communications services to which the customer may gain access to profile information. By gaining access to the profile information, the customer may view the information, and may add, delete, turn-on, turn-off, change, or otherwise modify one or more services. The list of communications services may include services to which the customer subscribes or which otherwise may be available to the customer. The exemplary list of communications services displayed on PDA 20 includes a reference to call forwarding service.

Figure 2:
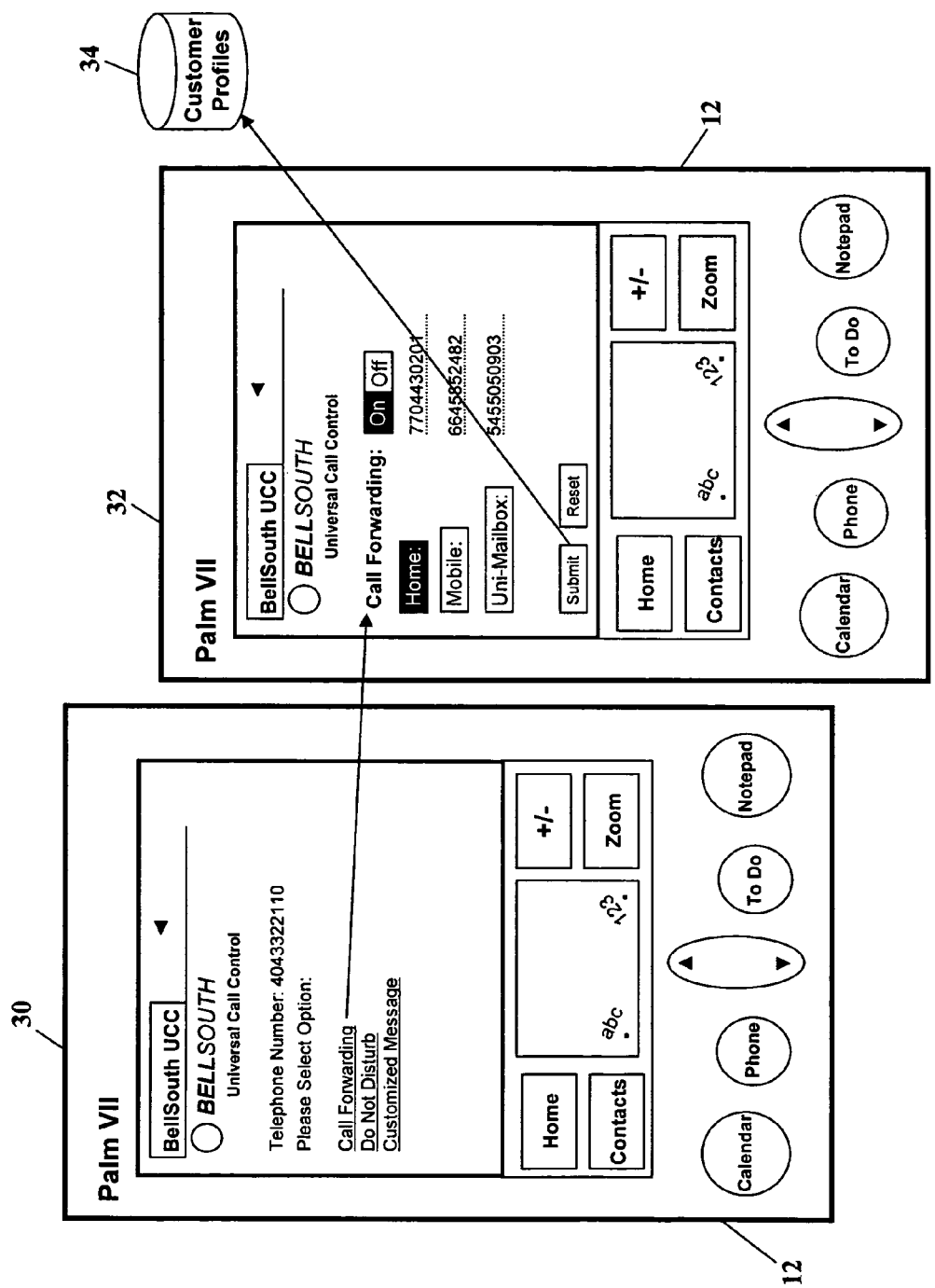
FIG. 2 illustrates the exemplary wireless unit of FIG. 1 with additional details in the implementation of an exemplary embodiment.

FIG. 2 illustrates a PDA 30, like PDA 20 in FIG. 1, with the list of the communications services on display on the PDA's monitor 12. The display on PDA 30 also includes a reference to the customer's business telephone number of "4043322180". To access profile information related to the customer's call forwarding service on that telephone number, the customer activates or clicks-on the call forwarding reference. When the subscriber activates the call forwarding reference, additional displays are presented. With the additional displays, the subscriber may change the "forward-to" number from the business telephone number to the home telephone number (or any other telephone number desired by the customer).

For example, PDA 32 displays profile information related to the customer's call forwarding service. This profile information is obtained by the PDA 32 (as explained in greater detail below) through the Internet and/or the public switched telephone network (PSTN) from a service platform (server or other element) and associated with or including a database or other storage of customer profiles 34.

Referring again to the display of profile information related to the customer's call forwarding service on PDA 32, the customer may activate call forwarding service by clicking the "ON" reference. Should the customer change his or her mind, the customer may deactivate the service by clicking the "OFF" reference. On the display of PDA 32, the call forwarding service is indicated as "ON" (rather than "OFF"), and three directory numbers are displayed as options for the "forward-to" number. In this example, these three directory numbers include: Home; Mobile; and Uni-Mailbox (Universal Mailbox). Typically, a customer supplies directory numbers in the profile information so these numbers may be displayed as part of the profile information as options for the "forward-to" number for call forwarding service.

As illustrated on PDA 32, the Home directory number is highlighted, and such highlighting indicates the "forwarded-to" number for the customer's call forwarding service for telephone number "4043322180" is the home telephone number "7704432333". Of course, the customer may choose to designate a number other than the home telephone number or the numbers presented as options on the display as the "forward-to" number. To do so, the customer simply inputs the telephone number and such input may result in a display of the telephone number as the "forward-to" number on the monitor 12 of the PDA 32. Once the customer has made his or her choices with respect to call forwarding service, the customer may implement the choices by activating the "submit" reference on the display of the PDA 32. The activation of the "submit" reference causes the PDA 32 again to communicate (as explained in greater detail below) over the Internet and/or the PSTN with service platform (or other element) including the customer profiles 34. The communication with the service platform results in an update of the profile information related to the customer such that call forwarding service is turned-on and the home telephone number is included as the "forward-to" number.

As noted above, once the customer has made the desired change in the "forward-to" number, the change information is conveyed from the PDA through the Internet and/or PSTN to the service platform, web server, or other element hosting the profile information, and changes are made in the profile information. In some embodiments, the change information also may be forwarded to elements of the PSTN so information relating to the customer stored in the PSTN may be updated. When a call is received for the customer's business telephone number, the PSTN may use its profile information, or may take action by communicating over the Internet with the web server to obtain the profile information related to the customer. The profile information is then used in the PSTN to forward the call from the business telephone number to the customer's home telephone number as the "forward-to" number.

Figure 3:
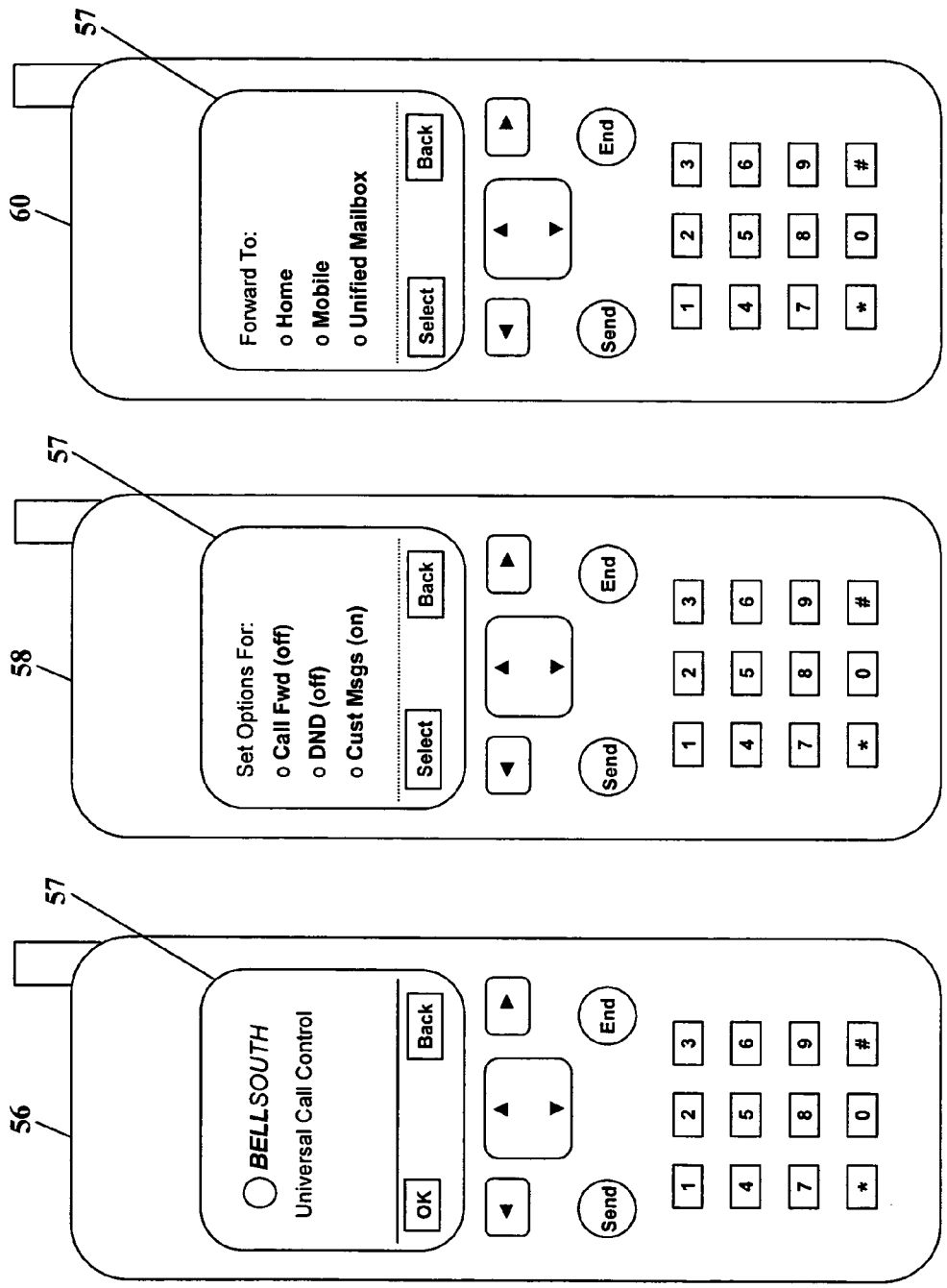
FIG. 3 illustrates another exemplary wireless unit that may be used with the exemplary embodiments of the inventions.

FIG. 3 provides preliminary examples of how a customer may use a WAP phone to turn-on a call forwarding service. The inventions described herein may be used with WAP phones or WAP devices such as the following: the Series 5mx16MB or the Series 7 16MB from Psion Inc., Concord, Mass.; the Mobile Phone R320 or R380 from Ericsson, Stockholm, Sweden; the Nokia Activ Office, ID, Security, or Alert from Nokia Mobile Internet Applications, Finland; the TalkAbout T2288, V.2288; or the Timeport P7389, P7389e, or P1088 from Motorola, Shaumburg, Ill.; or the S40 from Siemens, Munchen, Germany.

Referring to FIG. 3, assume a customer desires to have calls to the WAP phone forwarded to his or her home telephone number. The WAP phone 56 includes a display of the BellSouth GUI for the UCC system in its monitor 57. The WAP phone 58 includes another portion of the GUI for the UCC system on it monitor 57, displaying a list of the communications services with respect to which the customer may have access to profile information so as to view, or to add, delete, turn-on, turn-off, change, or otherwise modify a service.

In this example, assume a customer subscribes to call forwarding service, but the service is inactive. As illustrated on the display of WAP phone 58, there is a reference to call forwarding service in the list of services on the display. The call forwarding service includes a notation the call forwarding service is off (Call Fwd (off)). To turn-on the call forwarding service, the customer activates the Call Fwd reference. The customer has accomplished an initial step in turning-on the call forwarding service, but additional information relating to the "forward-to" number of the customer is required. In another display illustrated on WAP phone 60, the customer is presented with a list of options for a "forward-to" or forwarding number including: Home; Mobile; and Unified Mailbox. Some embodiments of the UCC system may allow the customer to pre-designate one or more telephone numbers that may be included in a list of options for a "forward-to" number whenever the customer desires to turn-on call forwarding service. Alternatively, the customer may enter a number other than presented in the list of options. As PDA 60 shows, the Home option is activated so calls to the WAP phone are forwarded to the home telephone number.

FIGS. 1, 2, and 3 illustrate exemplary wireless devices (a PDA and a WAP phone) that may be used by a customer to access the UCC system so the customer may view, and add, delete, turn-on, turn-off, change, or otherwise modify communication services provided to the customer. In addition, the customer may access the UCC system through wireline devices such as a telephone, a computer, or any other suitable device.

Figure 4:
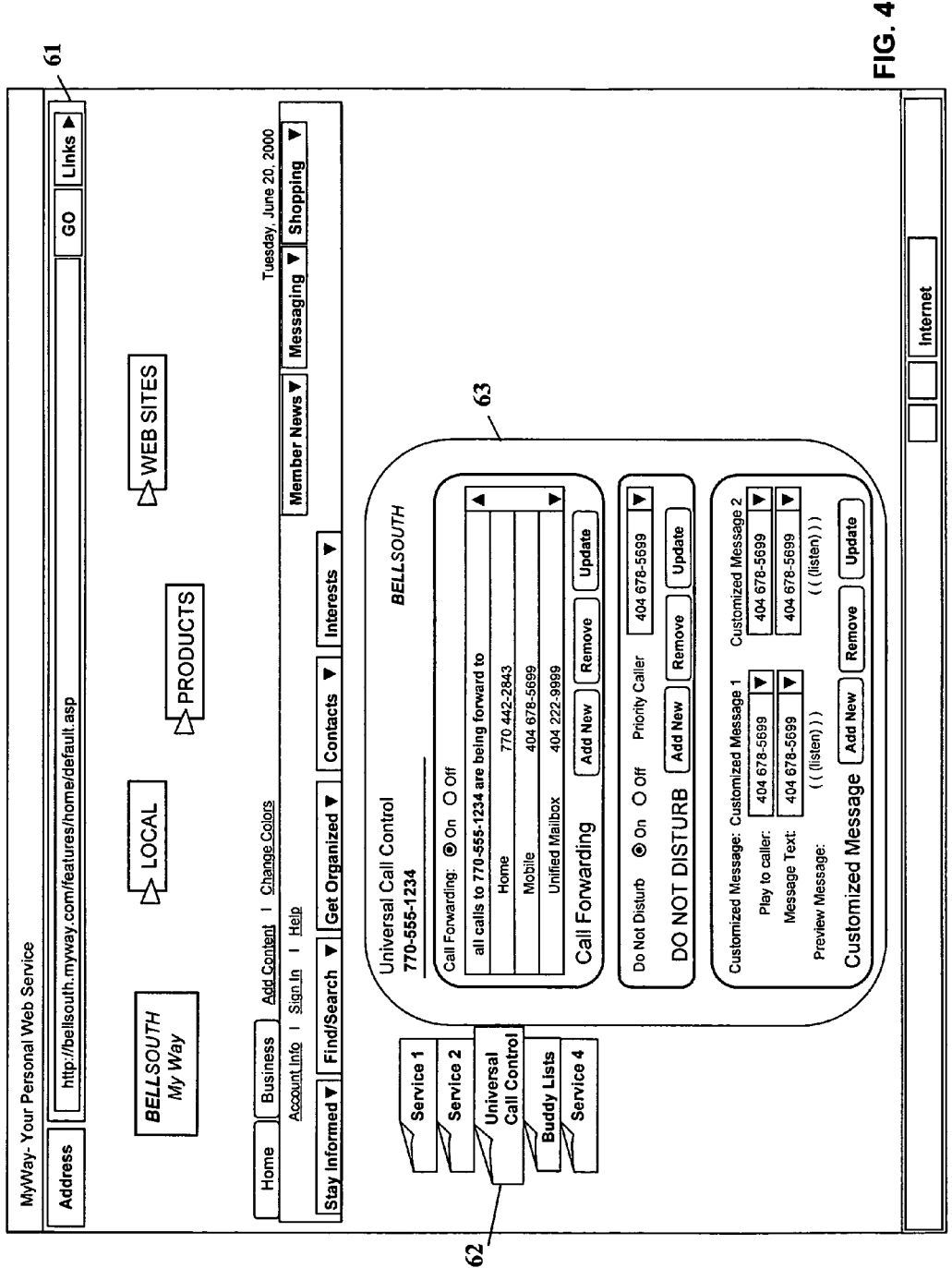
FIG. 4 illustrates an exemplary computer display screen that may be used with the exemplary embodiments.

FIG. 4 provides a preliminary example of how a customer may use a computer to view, and add, delete, turn-on, turn-off, change, or otherwise modify three exemplary services: call forwarding; do not disturb services; and customized messaging services. Initially, the customer accesses the appropriate web site for the UCC system. In the example, BellSouth is the service provider of the UCC system and provides a web site with an illustrated page 61 that allows a customer (whose telephone number is "770-555-1234" in this example) to access the UCC system by activating the Universal Call Control (UCC) reference 62 on the page 61.

As a result of the activation of the UCC reference 62, a window or other display 63 of information relating to the UCC system for telephone number "770-555-1234" is displayed. As with the PDA and WAP phone examples discussed above, the UCC display 63 on the computer displays profile information relating to the customer, and particularly, relating to the customer's call forwarding service. In addition, the UCC display 63 on the computer displays profile information related to two other services subscribed to and/or available to the customer: Do Not Disturb, and Customized Message. Advantageously, the UCC display 63 allows the customer to view, and add, delete, turn-on, turn-off, change, or otherwise modify any or all of the three services displayed to the customer. The profile information in the UCC display 63 is obtained by the computer through the Internet and/or PSTN from a web server hosting profile information, and in particular, customer profiles related to the UCC system. Typically, the protocol used by the computer in communicating with the web server is the hypertext markup language (HTML).

As noted above, a telephone is another wireline device that may be used by a customer to access, and add, delete, turn-on, turn-off, change, or otherwise modify communications services. Advantageously, the exemplary UCC system allows a customer to call the UCC system from any telephone. In response to the call, the UCC system "talks" to the customer and provides information related to the customer's communication services. For example, the UCC system may read the customer the present information contained in the profile information related to the customer's call forwarding service. The UCC system may then offer the customer options in adding, deleting, or otherwise changing or modifying the profile information. The customer may respond to the options orally by simply talking into the telephone and/or by inputting data through use of the telephone keypads and dual tone multi-frequency (DTMF) tones understood by the UCC system.

As explained below, the communication between the telephone being used by the customer and the UCC system is carried on through the Internet and/or PSTN. In particular, a VoiceXML (also referred to as VOXml) gateway may be included in the PSTN and/or the Internet to enable the communication. "VoiceXML" is an acronym for voice extensible markup language, and is a web development language based on XML (extensible markup language). The VoiceXML gateway enables access to and modification of web-based information through a normal voice interface. In addition, the VoiceXML gateway provides for automatic speech recognition and/or text-to-speech communication so there may be understandable communication between the customer on the telephone and the UCC system.

In sum, the inventions described herein store profile information about a customer's communications services in such a manner that the customer may use almost any type of communications device to access the profile information, and to make changes or modifications as desired. Advantageously, the customer may use the most convenient communications device to him or her to effect changes in his or her communications services at almost any time and from almost any place so as to make the communications services best serve the needs of the customer as he or she determines.

System Architecture

Figure 5:
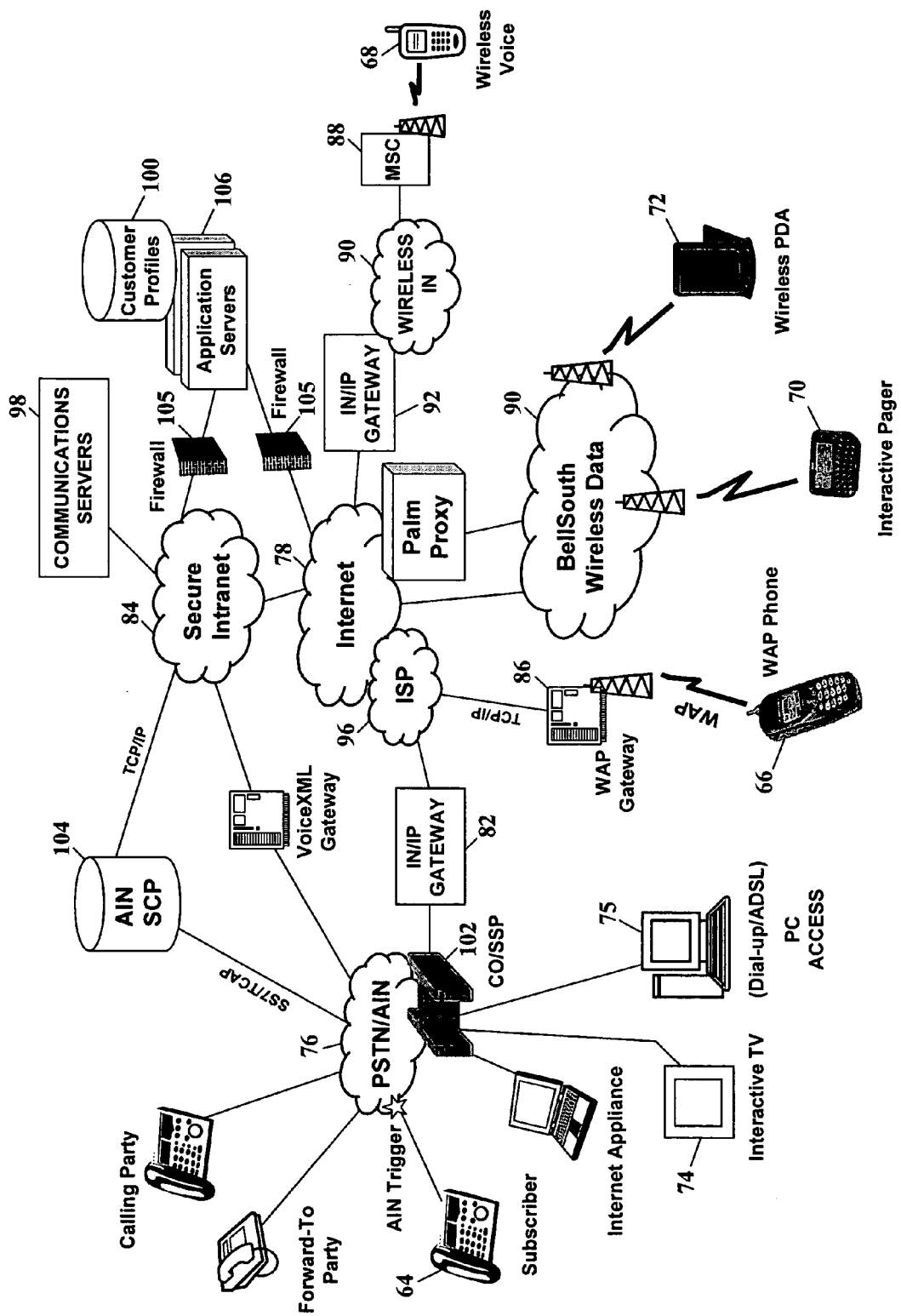
FIG. 5 illustrates an exemplary operating environment or architecture that may be used for implementing the exemplary embodiments.

FIG. 5 illustrates an exemplary environment or architecture that may be used for implementing the inventions described herein and/or the UCC system including the inventions described herein. Assume a customer (also referred to as a user or a subscriber) is provided with communications service relating to the telephone number associated with the customer's telephone 64. Also assume other communications services may be available to the customer for use on his or her telephone 64. The specific information related to the provision and/or availability of communications services for the customer is referred to herein as the profile information related to that customer. Specific details regarding the contents of the profile information are provided below in the section entitled "System Set Up". Suffice it to say here, that access to and the viewing of a customer's profile information reveals generally detailed information related to the communications services to which the customer subscribes, whether the services are ON or OFF; how, when, where, and with respect to whom the services are provided; whether the customer is available for communications, and if so, how the customer is available; and similar information such as the availability of other services to the subscriber, etc.

In other words, access to and the viewing of profile information provides the viewer with a profile about the implementation details related to most, if not all, of the communications services provided and/or available to the customer. Conveniently, the inventions described herein may store the profile information (as is described in detail below in the section entitled "System Set Up") "as-a-whole" so that any part or all of the profile information may be readily accessed, viewed, changed, or otherwise modified. In some embodiments, storing the profile information "as-a-whole" may mean storing all or most of the customer's profile information in a centralized fashion such as in the same place or element. In other embodiments, storing the profile information "as-a-whole" may mean storing the customer's profile information in such a way that parts of the profile information are linked to or otherwise are in correspondence with the other parts of the profile information such that all or part of the customer's profile information may be obtained, viewed, changed, or modified.

Preferably, the customer's profile information when stored "as-a-whole" is not duplicated. In other words, the customer's profile information is typically not stored "as-a-whole" in an element(s) of the PSTN and "as-a-whole" in an element(s) of a globally-accessible computing network, such as the Internet. The storage of the profile information "as-a-whole" in the exemplary embodiments has advantages with respect to other systems that may not store such information "as-a-whole." Profile information stored "as-a-whole" may be accessed readily from the storage location(s).

In contrast, some other methods and systems of call control available to service providers and/or customers may store the information about a customer's communications services in a "piecemeal" fashion—some information may be spread among one or more elements of the PSTN directly involved with providing services; some information may be located on servers in an intranet; still other information may be located in service platforms or elsewhere in elements of a data network such as the Internet, etc. Profile information stored in "piecemeal" fashion is not as readily accessed, viewed, and/or changed/modified as is profile information stored "as-a-whole."

Often, other methods and systems of call control duplicate the customer's profile information whether on a "piecemeal" basis or completely duplicate, replicate, etc. the profile information of a customer. Such duplication, replication, etc. and piecemeal storage leads to problems related to keeping all of the information in synchronization or at least accurate and current.

For example, a customer may be provided with access to his or her profile information in such other systems, but such access may be access to only a single element that fails to include all of the profile information. To access other information, the customer may have to otherwise communicate or go through multiple steps and processes in accessing the information. Even if the customer succeeds in modifying his or her profile information as desired, such modifications may not be made in all of the elements necessary to effectively modify the communications services provided to the customer.

Advantageously, the inventions described herein allow a customer to use almost any type of communications device to access all of his or her profile information, to view the information, and to make changes or modifications as desired. In particular, the customer may access the profile information so as to make changes such as to add, delete, turn-on, turn-off, or otherwise modify services that are available and/or provided. For ease of reference, all of these actions (accessing, viewing, adding, deleting, turning-on, turning-off, changing, otherwise modifying, and like actions) are referred to herein as "change actions".

As noted, profile information is stored in such a manner such that almost any type of convenient communications device may be used to access the profile information and make change actions. For example, a customer may use a wireless device such as a WAP phone 66, a cell phone or mobile phone 68, an interactive pager 70, a PDA 72, an interactive television (TV) 74, or any other suitable device. In addition, the change actions may be implemented by a customer through use of a wireline device such as a telephone 64, or a personal computer (PC) 75.

Generally, the communications services that may be affected by change actions by the customer are services provided through the Advanced Intelligent Network (AIN) of the public switched telephone network (PSTN) 76. Alternatively, the communications services that may be affected by the change actions described herein may be provided by one or more entities and other than through the AIN or PSTN. For example, a service provider may use one or more communications servers 98 connected through the Internet 78 (or other data network such as a secure intranet 84) to provide all or part of the services and/or service logic associated with the UCC system and/or one or more of the communications services provided to the customer.

Advantageously, the change actions described herein may be used with a wide range of communications services given the present invention's storage of information related to the customer as profile information in an "as-a-whole" format rather than having the information distributed "piecemeal" and/or duplicated, replicated, etc. across multiple elements of the PSTN 76, the Internet 78, and/or other networks. As another example, the communications services against which the change actions may be implemented may include services provided from a network having a packet-based architecture or infrastructure because the elements of such networks (such as a "soft switch") may directly access the web server 106 (or other platform) storing the profile information through the Internet 78 or other data network.

As noted, the change actions described herein may be used with a wide range of communications services including advanced services such as may be provided through the AIN/PSTN 76. The present inventions are described herein with reference to a few of the advanced services with which the inventions may be used, to-wit: call forwarding service; do not disturb (DND) service; and customized message data service. Nonetheless, advanced services are not limited to these three services, and the advanced services also may include calendaring services, communications circle services, time of day/day of week (TOD/DOW) services, caller or number identification services, call diversion services, priority caller services, call waiting services, personal number services, remote event notification services such as CallerID Anywhere service, and the like.

Further, the services may include or relate to accessing, viewing, modifying, deleting, adding, transmitting, and otherwise modifying features and applications on communications devices. For example, a customer may use the inventions described herein to access and to view, add, delete, change, transmit, copy, or otherwise modify an application or service like a remote file management program on his or her PC, a PDA or interactive pager, and such as PowerPoint files or the like type of files or data that may be used by a customer on his or her wireline and wireless devices.

For additional details on the Advanced Intelligent Network (AIN) of the PSTN, the reader is referred to the commonly assigned patent to Weisser, Jr., U.S. Pat. No. 5,430,719, which is incorporated herein by reference.

The wireless devices that may be used by the customer to modify the advanced services typically operate in connection with a global data/information network such as the Internet 78. To make the modifications from a wireless device operating on the Internet 78 to the advanced services provided to the customer's telephone 64 operating as part of the PSTN 76, there is a connection between the Internet 78 and PSTN 76 that may be implemented through an intelligent network/internet protocol (IN/IP) gateway 82 and/or a secure intranet 84.

FIG. 5 further illustrates some principal elements that may implement the connections among the wireless devices, other communication devices, the PSTN 76, and the Internet 78 as they relate to the inventions described herein. For example, the WAP phone 66 operates using the WAP through a WAP gateway 86 using TCP/IP with the Internet 78 and the PSTN 76. The wireless unit 68 operates in a wireless communications system, and particularly, communicates with a mobile switching center (MSC) 88 that may operate in a wireless intelligent network (IN) 90 and include an intelligent network/internet protocol (IN/IP) gateway 92 to the Internet 78 and the PSTN 76. The PDA 72 may communicate through a service provider 90 and/or an Internet service provider (ISP) 96 to the Internet 78 and the PSTN 76. The interactive TV 74 may communicate through the PSTN 76 or otherwise to the Internet 78 and the PSTN 76.

In addition, some communications servers 98 such as third party service providers may be connected through a Secure Intranet 84 or otherwise to the Internet 78 and the PSTN 76. As noted above, a third party service provider may be used to implement some or all of the UCC system for the service provider of the communications services. Alternatively, the communications server 98 may be used to implement some or all of the communications services provided to customers of the service provider providing communication service and/or the UCC system.

In addition, FIG. 5 illustrates that profile information about the customers of advanced services provided by a service provider may be stored in customer profiles 34 such as may be implemented in a database, table, log, server, service platform, or other suitable storage device. Typically, the profile information about a customer's services may be kept in a customer profile 34. A customer profile 34 may include, but is not limited to, the following information:

- a list of all communications services available and/or provided to the customer;
- for each service available to the customer, a list of the features of the service that may be affected by change actions by the customer;
- for each applicable service, an indication of whether the service is active (ON) or inactive (OFF);
- "presence" status such as any information related to how a subscriber can be reached such as an IP address, instant messaging address, e-mail address, pager address, other telephone numbers, passwords, identifiers, and the like;
- other information related to the customer such as files, scheduled events, calendars, log of activities, and/or communications, permissions for shareable information or public information, designation of private information, etc.

Generally, the customer's profile may be accessed by the service provider for the provision of the advanced services to the customer's designated telephone number(s). In addition, the customer's profile may be accessed by the customer to implement change actions. Further, as explained below in connection with Communications Circle (CC) services, some or all of the customer's profile may be accessed by persons or entities of the customer's communications circle. For the customer and for the persons or entities of the customer's communications circle, access to the customer's profile may be made through use of a wireless device such as a PDA or a WAP phone, or through a wireline device such as a telephone or a computer.

FIG. 5 illustrates the customer profiles 34 as connected through application servers 106 and a firewall 105 to a Secure Intranet 84 and to the Internet 78, and through the Internet 78 or the Secure Intranet 84 to the PSTN 76. The customer profiles 34, however, may be connected in other ways so as to be accessible as necessary through the PSTN 76 and/or the Internet 78. Further, the logic or programming necessary for implementation of the inventions described herein (such as the exemplary UCC system implementing some of the inventions) may be contained in application server(s) 106 such as may be included on a web server or service platform. As illustrated, the application servers 106 are shown as connected to customer profiles 34, and such connection as being located on the same server or platform may be preferable for ease of execution of the methods and systems described herein. Nevertheless, the application servers 106 and the customer profiles 34 need not be located on the same element such as a server or platform, but may be located in distinct elements that are functionally connected whether they are elements of the Internet 78, another data network, or the PSTN 76.

An advantage of storing the customer profiles 34 on a web server in the Internet 78 is that such information then is universally accessible through myriad wireline and wireless devices. Whatever device the customer uses to access the UCC system, for example, and his or her customer profile, it is the same customer profile that is accessed no matter the device. The customer profile is automatically synchronized because it is updated as necessary by changes from the customer and/or from service management, and no further updates to other corresponding information are necessary.

Further, the storage of customer profiles 34 on a web server in the Internet 78 may allow third parties to write to the customer profiles or provide third party applications that may be used with the customer profiles 34. For example, a third party may provide a calendar application used by a customer. The customer updates or modifies the calendar with an entry relating to an out-of-town visit. The calendar application may be configured to communicate with the UCC system, and particularly, with the customer profiles 34 so the customer's profile is updated as necessary with respect to the out-of-town visit.

Another example of a third party application that may be used with the inventions described herein is an itinerary application that may be maintained by a customer on a third party's server. The customer may make information related to his or her itinerary accessible to other people and through the UCC system or customer profiles 34. Further, the itinerary application may be so sophisticated as to automatically update the customer's itinerary in cases such as flight delays, etc. The itinerary application then may update the customer's profile information in the UCC system. Colleagues of the customer who have access to his or her itinerary are provided with the most up-to-date version of the itinerary.

Of course, customer profiles 34 could be duplicated in another element in the Internet 78 and/or the PSTN 76. To do so, the customer profiles 34 across the elements would have to be synchronized so as to provide uniformity of services. Such synchronization may require audits of the information across the elements, or other verification of proper synchronization.

As noted, FIG. 5 illustrates an exemplary environment or architecture that may be used in implementing the inventions described herein. For example, FIG. 5 illustrates an exemplary environment relating to the use of WAP phones and PDAs by customers in implementing change actions to services provided by a service provider and relating to the customer's communications services. Assume the wireline device 64 is the customer's telephone, which is served by an element of the public switched telephone network (PSTN) 76 and AIN referred to as a service switching point (SSP) 102. To implement an advanced service for a customer, the customer's telephone number may be provisioned with a terminating attempt trigger (TAT) at the SSP 102 serving the customer's number. When a call is received for the customer's number, the TAT causes the SSP 102 to pause in the processing of the call and to request instructions from another PSTN element referred to as a service control point (SCP) 104. The communications between the SSP 102 and the SCP 104 generally are made pursuant to the transactional capabilities application part (TCAP) and the Signaling System 7 (SS7) protocol.

The SCP 104 may include information relating to the processing of the call to the customer's telephone number, or the SCP 104 may obtain such information from another source. For example, information relating to the call may be present in a customer profile stored in the customer profiles 34. As illustrated in FIG. 5, the customer profiles 34 may be stored on a web server 106 or other platform connected to the Internet 78. Thus, the SCP 104 may be configured to include applications (sometimes referred to as service package applications (SPAs)) to be able to communicate to initiate a request for information relating to the call from the PSTN 76 through the Internet 78 to the web server 106 and customer profiles 34. The communication between the SCP 104 and the web server 106 may be made pursuant to the transmission control protocol/Internet protocol (TCP/IP). Once the SCP 104 obtains the information relating to the processing of the call, the SCP 104 provides instructions to the SSP 102.

FIG. 5 also illustrates how a customer might use a telephone 64 to make changes to his or her customer profile. The customer uses the telephone 64 to make a call to a specified directory number that is routed through the PSTN 76 to the VoiceXML gateway. The number dialed by the customer typically maps to an internet protocol (IP) address for the server or database with the customer profiles 34. A VoiceXML page is returned from the database to the gateway. The page includes text which is translated from text-to-speech by the gateway so the customer may hear the text. The customer responds to the speech, and the response is translated by the VoiceXML gateway and provided to the customer profiles 34.

FIG. 5 also includes additional information on typical protocols used between and/or among the elements of the exemplary environment. For example, FIG. 5 illustrates that WAP phone 66 communicates using the wireless access protocol (WAP) with the WAP gateway 86. The WAP gateway 86 communicates with the secure intranet 84 using TCP/IP. The secure intranet 84 also uses TCP/IP in communicating with the voice/web gateway 82. Further, the secure intranet 84 communicates using TCP/IP through the security solution with the Internet 78.

As noted above, the web server 106 hosting the customer profiles 34 may communicate using TCP/IP through the Internet 78 to the SCP 104 of the PSTN 76. In addition, the web server 106 may communicate using wireless mark-up language (WML) through the Internet 78 with the WAP gateway 86. Further, the web server 106 may communicate using voice extensible mark-up language (VoiceXML) through the Internet 78 to the voice/web gateway 82.

As noted above, profile information relating to a customer is stored in a customer profile typically held on a web server or other platform so the customer profile may be accessed by a customer over the Internet using a wireless device such as a WAP phone or a PDA.

System Set Up

FIG. 6 includes bullet points of information related to an exemplary set up of a customer profile in the Universal Call Control (UCC) system. A customer profile, of course, may be set up in other ways, and may contain different information depending on the customer, the service provider, the architecture, the web server, the database, table, log, or registry holding the customer profile, the services available to the customer, the services subscribed to by the customer, and other factors.

In the exemplary set up of FIG. 6, the customer profile is described as residing in a web server such as may be used with the Internet. The customer profile may be accessed via the Internet such as through use of a personal computer, through use of a telephone or other wireline device using the VoiceXML (or the like) protocol, or through a wireless device such as a PDA, WAP phone, interactive pager, or the like. Access to the customer profile may allow the customer to view the data in the customer profile and to implement change actions with respect to the data in the customer profile.

In the exemplary set up of FIG. 6, all access to a customer profile requires a password authentication. For example, a customer may use his or her PDA to access the customer profile on a communications presence registry. After initial contact with the registry, the customer may be requested to provide a password, an identifier, or some other information that may be verified or authenticated so as to determine whether the customer is authorized to access the customer profile.

As noted above, the customer profile may be used by the service provider in providing the customer with communications services. As part of the set up of the UCC system for any particular customer, a termination attempt trigger (TAT) is set in the service switching point (SSP) serving the customer's telephone number in the PSTN. When a call is received for the customer's telephone number at the SSP, the TAT is noted and the SSP pauses in its processing of the call for instructions from a service control point (SCP). In some cases in the UCC system, the SCP may store or otherwise include the customer's profile so as to be able to instruct the SSP on how to further process the call. But generally, pursuant to the exemplary UCC system, the SCP must obtain the customer profile before the SCP can provide the SSP with instructions on how to further process the call. Thus, the SCP communicates through the Internet to the web server or other platform housing the communication presence registry, and obtains the customer profile from that registry. Once the customer profile is obtained, the SCP uses the data from the customer profile in instructing the SSP on further processing of the communication.

Further, FIG. 6 illustrates exemplary data that may be included in a customer profile relating to a customer who subscribes to three advanced services with respect to which the customer may make change actions. The three advanced services include: call forwarding service; do not disturb service; and customer message data service. The customer profile includes the customer's telephone number (also referred to as the subscriber's directory number). Typically, the customer's telephone number is used as the key in searching the communication presence registry for the customer profile relating to the customer.

For the call forwarding service, the customer profile may include an indication of the status of the call forwarding service, i.e., whether the service is active (ON) or inactive (OFF). If the customer decides to implement the call forwarding service, then calls dialed to the customer's number having the service are forwarded to another telephone number. These "forwarded-to" numbers also may be referred to as "Active Reach Numbers". In this example, the customer has included his or her home telephone number, mobile number, and unified mailbox number as possible "forwarded-to" number. When the customer is implementing the call forwarding service using the UCC system, the customer may choose one of the listed numbers as the "forwarded-to" number. Alternatively, the customer may enter a telephone number to be used as the "forwarded-to" number.

For the do not disturb (DND) service, the customer profile may include an indication of the status of the service, i.e., whether the service is active (ON) or inactive (OFF). Generally, when the service is active, calls are not terminated to the customer's number. Some types of DND service allow a customer to specify one or more telephone numbers that may "by-pass" the DND service when the service is active so that calls from those specific telephone numbers may be terminated to the customer's telephone number. Generally, a caller who is allowed to by-pass the DND service is referred to as a priority caller. A priority caller's telephone number is referred to as a priority caller phone number. Thus, the customer profile for DND service may include one or more priority caller phone numbers. If a call is received for the customer's telephone number as originating from one of these priority caller phone numbers, then the call is put through to the customer rather than being blocked by the DND service.

For the customized message (CM) service, the customer profile may include an indication of the status of the CM service, i.e., whether the service is active (ON) or inactive (OFF). If the customer decides to implement the CM service, then the customer may specify that calls received from one or more specific telephone numbers are to be provided with a message.

Generally, a caller who is to be provided with a message per the CM service is referred to as a CM caller. A telephone number of a CM caller is referred to as a CM caller's telephone number. Thus, the customer profile for CM service may include one or more CM caller's telephone numbers. If a call is received for the customer's telephone number as originating from one of these CM caller's telephone numbers, then the call is provided with a message. The customer may specify a message to be provided to the CM callers. As indicated in FIG. 6, the customer may compose his or her own message, and provide up to 100 characters of message (or some other predetermined number of characters). These characters of message are referred to as the CM Text and are included in the customer profile. In an alternative embodiment, the CM service may provide the customer with message options so the customer does not have to compose his or her own message. For example: the CM service may allow a customer to choose from one of the following standard messages: "Call me later"; "I'm unavailable"; etc.

As noted above, when a customer subscribes to the UCC system, a terminating attempt trigger (TAT) is provisioned with respect to the customer's telephone number at the service switching point (SSP) serving the telephone number. When a call is received for the customer's number, the SSP requests instructions from a service control point (SCP) in the PSTN. Generally, the SCP must obtain the customer profile so as to instruct the SSP on how to further process the communication. The SCP obtains this information through communication over the Internet with the web server or other platform housing the communication presence registry having the customer profile. The SCP communicates over the Internet with the web server/communication presence registry using one or more TCP/IP query/response exchanges or message sets.

FIG. 7 illustrates an exemplary TCP/IP message set such as may be exchanged between an SCP and a web server communicating over the Internet with regard to a customer who subscribes to three advanced services. These three services include: call forward service; do not disturb (DND) service; and customized message (CM) service. The left column of information on FIG. 7 begins with an exemplary specification of the types of information or data that may be included in a TCP/IP query relating to a customer from the SCP to the web server. Following the exemplary TCP/IP query, FIG. 7 also illustrates an exemplary specification of the types of information or data that may be included in a TCP/IP response corresponding to the TCP/IP query described above. The TCP/IP response is from the web server to the SCP.

Exemplary Communications Service—Communications Circle Service

An example of a communications service is a communications circle (CC) service. An exemplary CC service allows a subscriber to specify person(s) or other entities who are to be included in the subscriber's communications circle. A log, table, or other structure may store information about each entity in the communications circle. The information may include a name, password, other identifier, a telephone number, a facsimile number, an e-mail address, a mobile phone number, etc. This information may be used to allow the subscriber to quickly contact the entities in his or her communications circle.

In addition, persons or other entities in the communications circle may be allowed access to some or all of the profile information in the UCC system relating to the subscriber. The access to some or all of the profile information about a subscriber in the UCC system may provide the person in the communications circle with real-time information about the subscriber, and thus, facilitate communications between the person in the communications circle and the subscriber. For example, a person in the communications circle may check profile information on the subscriber to determine whether the subscriber has turned on his or her mobile unit or interactive pager. If so, the person then may attempt to reach the subscriber at his or her mobile unit or interactive pager rather than first trying the subscriber's home or office telephone number. As a result, the person may save time in contacting the subscriber, and the subscriber at least may appear to be more readily available for communication with the person in the communications circle.

Advantageously, the person in the communications circle may access some or all of the profile information in the UCC system relating to the subscriber through use of a wireless device such as a PDA or WAP phone. For example, a person in the communications circle may use his or her PDA to access some of the subscriber's profile information in the UCC system and check whether the subscriber has turned on his or her mobile unit or interactive pager. In sum, the person in the communications circle may access some or all of the profile information in the UCC system relating to the subscriber to gain information about the subscriber. Generally, a person in the communications circle does not have the same privileges as the subscriber in implementing the change actions relating to communications services of the subscriber. Rather, the person in the communications circle typically has only "read-only" privileges relating to the profile information of the subscriber in the UCC system.

For additional details on CC services, the reader is referred to the commonly assigned patent application entitled "Shared Communication Presence Information", filed in the United States Patent and Trademark Office on Nov. 10, 2000, assigned Ser. No. 09/709,038, and incorporated herein by reference.

The universal call control methods and/or systems described herein may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mentioned here but considered within the scope of this invention, allow the computer product of the universal call control methods and/or systems to be easily disseminated.

Still in further exemplary embodiments, the universal call control methods and/or systems may be physically embodied on or in any addressable (e.g., HTTP, I.E.E.E. 802.11, Wireless Application Protocol (WAP)) wireless device capable of engaging in a session initiation protocol communication or other similar communication. Examples could include a computer, a wireless personal digital assistant (PDA), an Internet Protocol phone, and/or a wireless pager.

In conclusion, the inventions described herein including the universal call control (UCC) systems and methods allow a customer to use almost any type of communications device to change or modify communications services provided to the customer. While several exemplary implementations of embodiments of this invention are described herein, various modifications and alternate embodiments will occur to those of ordinary skill in the art. For example, the universal call control systems and/or methods may use different communications formats, such as, for example, Hyper-Text Transfer Protocol (HTTP), URL formats, and Extensible Style Sheet (XSL) formats, Real Simple Syndication (RSS) that uses XML structures. Accordingly, this invention is intended to include those other variations, modifications, and alternate embodiments that adhere to the spirit and scope of this invention.

What is claimed is:

1. With respect to a search for a subscriber's location, a method for facilitating narrowing of a number of possible locations of the subscriber, comprising:
   storing profile information about telecommunications services provided to the subscriber, the profile information being stored as a whole on a webserver in a data network, and the profile information including data about real-time use of a wireless communications unit by the subscriber;
   storing a communications circle for the subscriber, the communications circle specifying other persons having read-only privileges to the subscriber's profile information, the other persons unable to implement change actions relating to the telecommunications services of the subscriber;
   sending a list of communications services to the subscriber listing communications services i) to which the subscriber subscribes and ii) which are available for subscription;
   allowing the communications circle access to the profile information to determine whether the data about the real-time use of the wireless communications unit indicates the wireless communications unit is activated;
   receiving a call from a calling number;
   querying the profile information for the calling number;
   retrieving text from the profile information when the calling number is found in the profile information;
   providing the text to a calling party associated with the calling number; and
   when the data indicates the wireless communications unit is activated, communicating with the wireless communications unit to narrow the number of possible locations of the subscriber.

2. The method of claim 1, further comprising searching for the subscriber's location; and
   determining, from the profile information, that a searcher is authorized to have the access to the profile information prior to allowing the access.

3. The method of claim 2, wherein the profile information comprises identification of the searcher as an authorized searcher; and wherein determining the searcher is authorized comprises checking the profile information for the identification of the searcher as an authorized searcher.

4. The method of claim 2, wherein the change action is received at the webserver from a wireless unit associated with the subscriber.

5. The method of claim 1, wherein the wireless communications unit comprises a personal digital assistant (PDA).

6. The method of claim 1, wherein the wireless communications unit comprises an interactive pager (IP).

7. The method of claim 1, wherein the wireless communications unit comprises an interactive television (TV).

8. The method of claim 1, further comprising:
   storing an electronic calendar associated with the subscriber, the electronic calendar having an entry describing a future activity associated with a telephone number;
   changing the subscriber's profile information to correspond with the future activity;
   changing the subscriber's profile information to correspond with the telephone number; and
   changing the call forwarding number to the telephone number, such that the call forwarding service corresponds to the future activity.

9. The method of claim 8, further comprising changing the subscriber's profile information to block receipt of communications during the future activity.

10. The method of claim 8, further comprising changing the subscriber's profile information to activate a do not disturb feature during the future activity.

11. A computer-readable medium on which is encoded instructions for performing a method, the method comprising:
    storing profile information about telecommunications services provided to a customer, the profile information being stored as a whole on a webserver in a data network, and the profile information including data about real-time use of a wireless communications unit by the customer;
    storing a communications circle for the person, the communications circle specifying other persons having read-only privileges to the customer's profile information, the other persons unable to implement change actions relating to the telecommunications services of the customer;
    sending a list of communications services to the subscriber listing communications services i) to which the subscriber subscribes and ii) which are available for subscription;
    for each communications service that is available to the customer, sending a list of features of each available communications service that is affected by a change action;
    receiving the change action from the customer that changes the customer's profile information, the change action comprising a call forwarding number for call forwarding service;
    implementing the change action to result in changed profile information;

providing the changed profile information to a telecommunications system that provides the call forwarding service;

allowing the communications circle access to the profile information to determine whether the data about the real-time use of the wireless communications unit indicates the wireless communications unit is activated;

receiving a call from a calling number;

querying the profile information for the calling number;

retrieving text from the profile information when the calling number is found in the profile information;

providing the text to a calling party associated with the calling number; and when the data indicates the wireless communications unit is activated, communicating with the wireless communications unit to narrow a number of possible locations of the customer.

12. A system, comprising:

means for storing profile information about telecommunications services provided to a customer, the profile information being stored as a whole on a webserver in a data network, and the profile information including data about real-time use of a wireless communications unit by the customer;

means for storing a communications circle for the customer, the communications circle specifying other persons having read-only privileges to the customer's profile information, the other persons unable to implement change actions relating to the telecommunications services of the customer;

means for sending a list of communications services to the subscriber listing communications services i) to which the subscriber subscribes and ii) which are available for subscription;

for each communications service that is available to the customer, means for sending a list of features of each available communications service that is affected by a change action;

means for receiving the change action from the customer that changes the customer's profile information, the change action comprising a call forwarding number for call forwarding service;

means for implementing the change action to result in changed profile information;

means for providing the changed profile information to a telecommunications system that provides the call forwarding service;

means for allowing the communications circle access to the profile information to determine whether the data about the real-time use of the wireless communications unit indicates the wireless communications unit is activated;

means for receiving a call from a calling number;

means for querying the profile information for the calling number;

means for retrieving text from the profile information when the calling number is found in the profile information;

means for providing the text to a calling party associated with the calling number; and when the data indicates the wireless communications unit is activated, means for communicating with the wireless communications unit to narrow a number of possible locations of the customer.

\* \* \* \* \*